H. DE W. SAWYER.
DOWNDRAFT HEATING APPARATUS.
APPLICATION FILED FEB. 7, 1907. RENEWED AUG. 12, 1909.

951,703.

Patented Mar. 8, 1910.

WITNESSES
Herman W Ladd
A. T. Palmer

INVENTOR
Howard DeWolf Sawyer
by A. H. Spencer
Attorney

UNITED STATES PATENT OFFICE.

HOWARD DE WOLFE SAWYER, OF REVERE, MASSACHUSETTS.

DOWNDRAFT HEATING APPARATUS.

951,703.         Specification of Letters Patent.     Patented Mar. 8, 1910.

Application filed February 7, 1907, Serial No. 356,142. Renewed August 12, 1909. Serial No. 512,599.

*To all whom it may concern:*

Be it known that I, HOWARD DE WOLFE SAWYER, of Revere, in the county of Suffolk and State of Massachusetts, have invented certain new and useful Improvements in Downdraft Heating Apparatus, of which the following is a specification.

The object of this invention is to provide improved hot-water heating apparatus operating on the down draft principle and embodying, in a suitable shell or casing, a succession of tubular water heating grates, a tubular fuel-supporting grate and a similar super-heating grate or radiator above the fire,—these being connected in series at both ends of their enlarged headers, for continuous upward circulation of the water to be heated and, by external delivery and return pipes, conducting the water to radiators located in the rooms to be heated and returning it to the base of the heater to repeat, indefinitely, this circulation movement from bottom to top. The casing is rectangular with a skeleton frame of angle iron, to which the plates are secured, and a lining layer of asbestos protects the casing and limits radiation therefrom. The fuel chamber and draft inlet being at top and the ash-pit and flue-opening at bottom, the normal caloric current is downward between the water-containing tubular bars of the several grates, the temperature increasing as the water rises through the successively hotter grate-tubes. The radiator at top of the firepot or combustion chamber receives the direct radiant heat of the fire. Dampered outlets from the back of the firepot into the funnel may serve to reverse the draft when desired.

Figure 1:
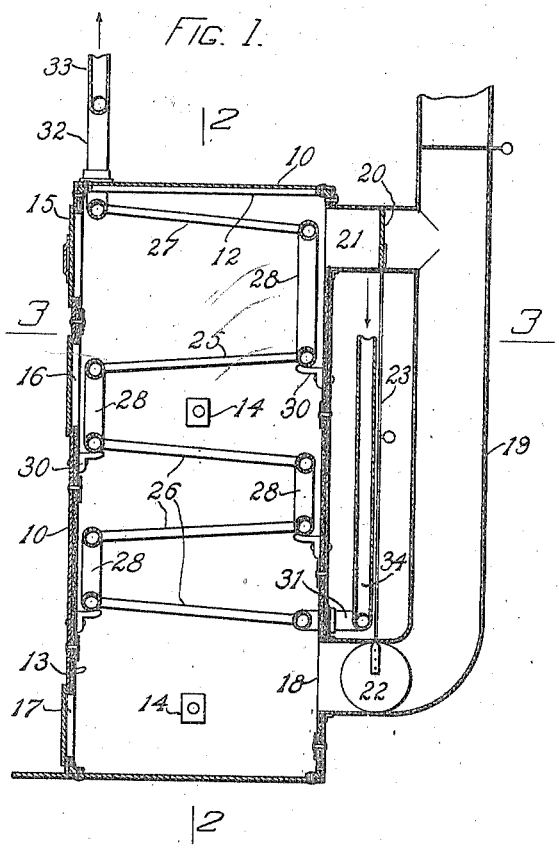
Figure 2:
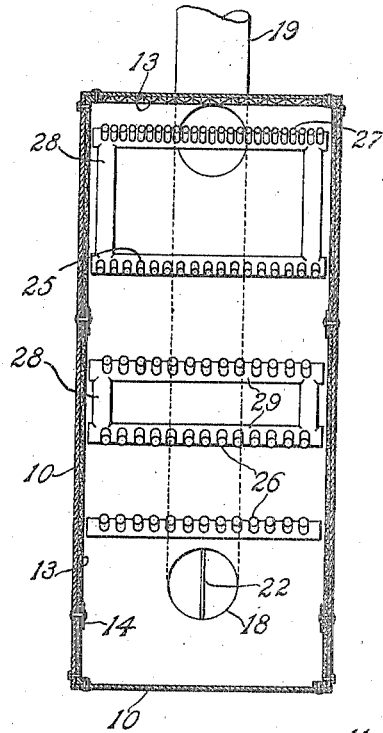
Figure 3:
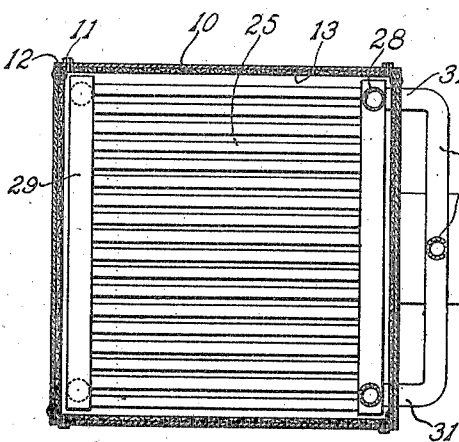
Figure 4:
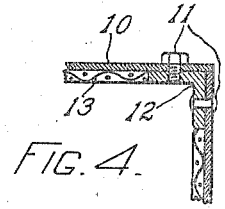

In the drawing, Figure 1 is a vertical section through the heater, Fig. 2 a like view taken on the line 2—2 of Fig. 1, and Fig. 3 a horizontal section on line 3—3 of Fig. 1. Fig. 4 is an enlarged sectional detail of one corner.

The casing 10 is preferably formed of rectangular wrought iron or steel plates composing the four vertical walls and the top and bottom of the heater. These plates will be secured by bolts or rivets 11 to angle iron corner bars 12 first united into a skeleton frame. The vertical plates are coated internally with a lining of asbestos, 13, to protect them from the intensity of the heat and limit its radiation into the room in which the heater is located. These lining layers are preferably held, at intervals, to the respective plates by thin metal strips or pieces 14, riveted to the plates, see Figs. 1 and 2. These pieces may be extended indefinitely or any other holding means employed. The front wall of the casing is furnished with three doors, the draft inlet and fuel door 15 at its upper portion, a rake-out door 16 somewhat lower down, and an ash door 17 at the bottom. The rear wall has an opening 18 near its lower end to connect with the funnel 19 and give an outlet for the caloric current after the heat thereof has been largely absorbed or utilized in raising the temperature of the water. A direct outlet from the fire pot to the funnel may be had by opening the damper 20, shown closed in the short pipe-section 21, Fig. 1. Such opening would close damper 20 at the base of the funnel, both dampers being shown as secured to the oscillating rod 23. The fuel-door will have an ordinary sliding or oscillating draft regulator to control the admission of air.

Inclosed within the casing is the system of tubular grates and connections, comprising the fuel-supporting grate 25, a plurality of water heating grates 26 beneath it, and a super-heater or radiator 27 above it, these grates being reversely inclined and successively connected at both ends by risers 28, to form a sinuous passage upwardly, about as shown. Each grate has, as shown in Fig. 3, enlarged marginal tubes 29, with which the slender tubular parallel bars connect laterally, their slightly tapering ends being simultaneously forced into the rows of perforations, shaped to receive them. By preference I use, for the fuel grate and the radiator or super-heater, steel tubes three eighths inch in diameter with one fourth inch bore, the grate tubes being spaced 1-5/16 inches between centers and the radiator tubes about one inch. For the lower grates the tubes will be of the same material, say one half inch diameter and more widely spaced. The inclination will be about 1-1/2 inches to the foot. These details of the grates and connections are here suggested as suitable and practical, but I do not design to limit myself thereto. Through these small grate tubes the water continually rises, the current divided into numerous fine streams, alternating with the larger marginal tubes and risers, while the descending caloric current of great intensity, due to the direct action of the fire and the burning of the generated gases in the combustion chamber above and below the fuel grate, passes downwardly between the tubular grate bars and impinges with powerful heating effect on them and their connecting tubes. The result is the speedy heating of the water, and its rapid movement upwardly serves to scour the tubes internally, while the inclosed streams prevent the possibility of melting or burning out the grate bars which would otherwise occur. The grates may be properly supported by lugs 30 beneath their marginal tubes and secured to the casing. The water for circulation enters at the lower margin of the bottom grate, as at 31, Fig. 1, and emerges through pipes 32 at opposite ends of the upper margin of the topmost grate or superheater 27. The pipes 32 extend obliquely and unite. Thence by pipe 33, duly extended to a succession of radiators not shown, located in several different rooms to be heated, the hot water current passes, returning, more or less cooled, to the heated base through pipe 34, which, in Fig. 3 is shown branched or diverging to enter both ends of the lower grate. This circulation movement continues indefinitely.

I claim as my invention:—

1. In a down-draft heating apparatus, an inclosing casing having a fuel chamber and door thereto at top, a succession of water-heating grates therein, and connected in series at each end and opposite sides, by enlarged risers, in combination with external circulation and return pipes, for heating rooms remote from the heater proper, substantially as set forth.

2. In a down-draft-heating apparatus, an inclosing casing having a skeleton frame of angle iron to which the casing plates are secured, a fuel chamber and door thereto at top, and normal outlets for the products of combustion at the bottom, in combination with tubular water-containing grates and connections therefor within said casing and with inlet and outlet pipes external thereto adapted to maintain a constant circulation of water exposed to the high heat within the casing, for the purpose set forth.

3. In a down-draft heating apparatus an inclosing casing having a fuel chamber, door and air inlet thereto at top and an ash outlet and funnel opening at bottom, in combination with a tubular fuel grate, a plurality of water heating grates of like character below, and a similar radiator or super heating grate above the fuel grate, within the casing, and with tubular water connections uniting said grates in series, for continuous water circulation upwardly through and returning to the heater, while the caloric current moves downwardly between the grate bars, substantially as set forth.

4. In a down draft heating apparatus an inclosing casing formed of metallic plates united cornerwise and provided with an asbestos lining suitably secured thereto, the fuel door and draft inlet being at top, the ash door and funnel opening at bottom and a rake-out opening between them, in combination with a water-containing fuel grate and a multiplicity of water-heating tubes traversing the heating chamber below the grate and connected in series therewith and with conducting and return pipes to maintain a constant circulation, substantially as set forth.

In testimony whereof I have affixed my signature, in presence of two witnesses.

HOWARD DE WOLFE SAWYER.

Witnesses:
A. H. SPENCER,
H. W. LADD.